United States Patent [19]

Khoury

[11] Patent Number: 4,504,181
[45] Date of Patent: * Mar. 12, 1985

[54] METHOD OF FORMING SCORED METAL SHEET

[75] Inventor: Nick S. Khoury, Worth, Ill.

[73] Assignee: Continental Can Company, Inc., Stamford, Conn.

[*] Notice: The portion of the term of this patent subsequent to Sep. 7, 1999 has been disclaimed.

[21] Appl. No.: 417,980

[22] Filed: Sep. 14, 1982

Related U.S. Application Data

[63] Continuation-in-part of Ser. No. 964,760, Nov. 29, 1978, Pat. No. 4,348,464.

[51] Int. Cl.$^3$ ...................... B21D 17/02; B21D 51/38
[52] U.S. Cl. .......................................... 413/17; 413/67
[58] Field of Search ............................. 428/571, 572; 29/DIG. 33; 413/17, 15, 16, 12, 55, 8, 67; 83/879, 880; 72/324; 225/96

[56] References Cited

U.S. PATENT DOCUMENTS

| | | | |
|---|---|---|---|
| 3,359,773 | 12/1967 | Stochbery | 83/879 |
| 3,406,866 | 10/1968 | Jasper | 413/12 |
| 3,650,006 | 3/1972 | Kinkel | 428/606 |
| 3,688,718 | 9/1972 | Schrecker | 413/12 |
| 3,728,980 | 4/1973 | Fraze | 83/879 |
| 3,946,683 | 3/1976 | Jordan | 413/17 |
| 3,954,075 | 5/1976 | Jordan | 83/880 |
| 4,012,935 | 3/1977 | Holk et al. | 413/55 |
| 4,122,791 | 10/1978 | Brown | 413/12 |
| 4,348,464 | 9/1982 | Khoury | 428/571 |

FOREIGN PATENT DOCUMENTS 1164179 9/1969 United Kingdom .................. 413/17

Primary Examiner—L. Dewayne Rutledge
Assistant Examiner—J. J. Zimmerman
Attorney, Agent, or Firm—Charles E. Brown

[57] ABSTRACT

This relates to the formation of a line of weakening in the form of a score in a metal sheet for defining a line along which the metal sheet may be ruptured. It has been found that when the metal sheet in the area which is to be scored is compressed, the metal sheet may be more easily scored to a controlled residual with a minimum of undue fracture. Accordingly, beads are coined on the underside of the metal sheet on opposite sides of the intended position of the score in a first operation to compress the metal. The then compressed metal is engaged by a conventional scoring die on the opposite surface thereof and scoring of the metal is effected in the normal manner.

4 Claims, 3 Drawing Figures

METHOD OF FORMING SCORED METAL SHEET

This application is a continuation-in-part of my copending application Ser. No. 964,760, filed Nov. 29, 1978, now U.S. Pat. No. 4,348,464.

This invention relates in general to new and useful improvements in scores formed in metal sheets to function as weakening lines wherein portions of the metal sheet may be torn therefrom. A typical usage of such a scored metal sheet is in relation to end panels of metal can ends wherein the ends are of the easy opening type and a portion or all of the ends are removed or displaced.

It has been found desirable to compress the metal of the sheet metal in the area where the score is to be formed so as to permit a relatively deep score to be formed with a resultant desired score residual without fracture. In accordance with my prior application, the compressing of the metal in the area of the score and the forming of the score were effected simultaneously in a single step operation. It has been found that by coining beads in the underside of the metal sheet in a first operation to compress the metal in the area of the score and then, in a second operation, scoring the metal sheet in the area wherein compression of the metal has previously occurred provides for a better control of the score residual with less fracture.

With the above and other objects in view that will hereinafter appear, the nature of the invention will be more clearly understood by reference to the following detailed description, the appended claims, and the several views illustrated in the accompanying drawings.

In accordance with the invention, there is provided a metal sheet 5 which may have a thickness ranging generally on the order of 0.012 inch to 0.016 inch having formed in the upper surface thereof a score 6 in the form of a generally V-shaped groove. The material of the metal sheet 5 in the area of the score is in a compressed state so as to eliminate fracture of the metal sheet in alignment with the score 6 prior to a time wherein it is desired to rupture the metal sheet in alignment with the score 6.

Figure 1:
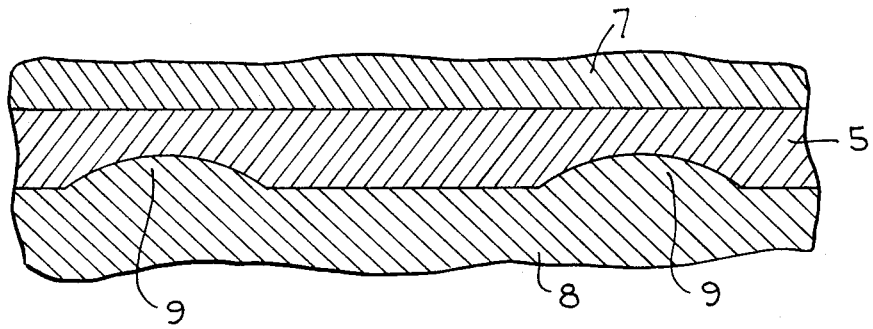
FIG. 1 is a sectional view through a metal sheet, such as the end panel of an end unit, and shows the same in a first operation having beads coined therein.
Figure 2:
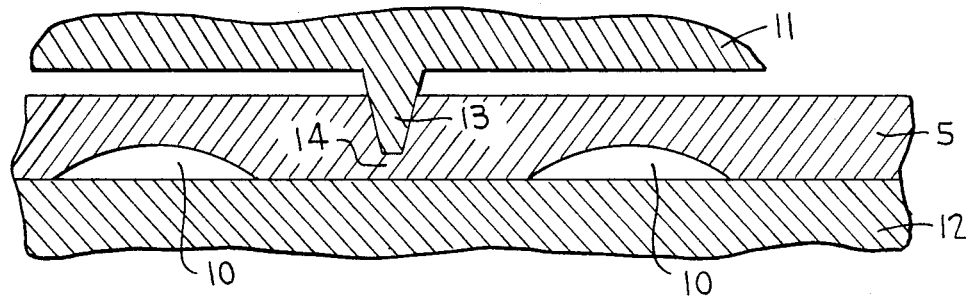
FIG. 2 is a sectional view similar to FIG. 1, and shows the previously coined metal sheet having a score formed in the area between the coined beads in a second operation.
Figure 3:
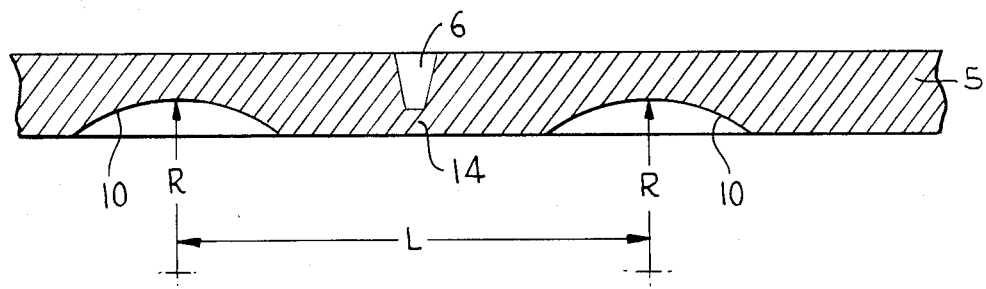
FIG. 3 is a fragmentary sectional view through the scored metal sheet, and shows the general details thereof.

In accordance with this invention, when the scoring of the metal sheet 5 is first subjected to a first operation as shown in FIG. 1, the metal sheet 5 is worked upon by a pair of opposed die members 7 and 8. The die member 7 is planar, while the die member 8 is provided with a pair of circular cross-sectional upstanding ribs 9. As a result of the forming operation of FIG. 1, the underside of the metal sheet 6 has coined therein two part-circular beads 10.

It is to be understood that in the coining of the beads 10, metal is displaced in the metal sheet 5 with the metal flowing in part toward the area between the beads 10 and thus causing the area of the metal sheet 5 between the beads 10 to be highly compressed.

The thus worked metal sheet 5 is then subjected to a second operation between a pair of die members 11 and 12. The die member 12 may be flat or, if desired, may be similar to the die member 8. The die member 11, on the other hand, is a scoring die and includes a scoring rib 13.

It is to be noted that in the second operation the scoring rib 13 is aligned with the area of the metal sheet between the two beads 10, and thus the scoring die 11 engages metal which has been previously highly compressed during the formation of the coined beads 10. It has been found that by having the metal of the metal sheet 5 in the area to be engaged by the scoring rib 13 in a previously highly compressed state, a desired residual 14 can be obtained under controlled conditions and without fracture. It is to be understood that the residual 14 is that thickness of metal between the underside of the metal sheet 5 and the bottom of the score 6. The residual 14 may be very shallow, for example on the order of 0.003 inch.

It will be readily apparent that inasmuch as no metal is removed during the formation of the score 6, that the scoring operation results in a further compression of the metal of the metal sheet 5 between the coined beads 10, and this emphasizes the scoring and facilitates rupture of the metal sheet 5 through the residual 14 in alignment with the score 6.

It is to be understood that the score 6 is of a conventional cross section and in and of itself forms no part of this invention.

Depending on the thickness of the metal sheet 5, the coined beads 10 will be of a radius R ranging from 0.015 inch to 0.030 inch, and the spacing between the centers of the coined beads 10 will range between 0.045 inch and 0.090 inch.

It is to be noted that by first coining the underside of the metal sheet 5 and then forming the score 6 in a separate operation with the central portion of the metal sheet between the coined beads 10 and in alignment with the intended position of the score, the underside of the metal sheet remains substantially flat in the area of the score 6, and thus facilitates the control of the residual 14.

Although only a preferred embodiment of the score and the method of forming the same has been specifically illustrated and described herein, it is to be understood that minor variations may be made in the scoring method and the resultant scored metal sheet without departing from the spirit and scope of the invention as defined by the appended claims.

I claim:

1. A method of forming a weakening line in the form of a score in a metal sheet, said method comprising the steps of in a first operation coining in a first surface of the metal sheet a pair of adjacent beads thereby compressing the metal of the sheet in the area between the beads, and then in a second and separate operation scoring the opposite surface of the metal sheet in the previously compressed area between the beads.

2. A method according to claim 1 wherein the beads are part circular in cross section.

3. A method according to claim 1 wherein the beads are part circular in cross section and have a radius on the order of 0.015 to 0.030 inch.

4. A method according to claim 1 wherein the beads are part circular in cross section and are spaced center-to-center on the order of 0.045 to 0.090 inch.

* * * * *